United States Patent
Tseng et al.

(10) Patent No.: US 7,142,517 B2
(45) Date of Patent: Nov. 28, 2006

(54) METHOD FOR OBJECTIVE PLAYOUT QUALITY MEASUREMENT OF A PACKET BASED NETWORK TRANSMISSION

(75) Inventors: Kuo-Kun Tseng, Hsin-Chu (TW); Ying-Dar Lin, Hsin-Chu (TW)

(73) Assignee: Accton Technology Corporation, Hsin-Chu (TW)

( * ) Notice: Subject to any disclaimer, the term of this patent is extended or adjusted under 35 U.S.C. 154(b) by 891 days.

(21) Appl. No.: 10/065,174

(22) Filed: Sep. 24, 2002

(65) Prior Publication Data

US 2004/0057383 A1 Mar. 25, 2004

(51) Int. Cl.
H04L 12/26 (2006.01)

(52) U.S. Cl. .................... 370/252; 370/235
(58) Field of Classification Search .............. None
See application file for complete search history.

(56) References Cited

U.S. PATENT DOCUMENTS

| | | | |
|---|---|---|---|
| 5,214,687 A | 5/1993 | Kansakoski et al. | |
| 5,386,495 A | 1/1995 | Wong et al. | |
| 5,432,778 A | 7/1995 | Minde et al. | |
| 5,490,288 A | 2/1996 | Wiatrowski | |
| 5,598,431 A | 1/1997 | Lobel | |
| 5,600,632 A | 2/1997 | Schulman | |
| 5,630,210 A | 5/1997 | Marry | |
| 5,721,754 A | 2/1998 | Chen | |
| 5,815,634 A | 9/1998 | Daum et al. | |
| 5,848,384 A | 12/1998 | Hollier et al. | |
| 6,021,385 A | 2/2000 | Jarvinen et al. | |
| 6,072,809 A | 6/2000 | Agrawal et al. | |
| 6,091,447 A | 7/2000 | Gershfeld | |
| 6,092,040 A | 7/2000 | Voran | |
| 6,157,830 A | 12/2000 | Minde et al. | |
| 6,201,960 B1 | 3/2001 | Minde et al. | |
| 6,259,677 B1* | 7/2001 | Jain ........................ 370/252 |
| 6,363,116 B1 | 3/2002 | Edwards et al. | |
| 6,370,120 B1 | 4/2002 | Hardy | |

OTHER PUBLICATIONS

Fujimoto, Adaptive Playout Buffer Algorithm for Enhancing Perceived Quality of Streaming Applications, Master's Thesis, pp. 1-54, Feb. 2002.*
Lai et al, Perceptual Codec and Interaction Aware Playout Algorithms and Quality Measurement for VoIP Systems, IEEE, pp. 297-305, 2004.*
R. Ramjee, J. Kurose, D. Towsley, and H. Schulzrinne, "Adaptive Playout Mechanism for Packetized Audio Applications in Wide-Area Networks", Proceedings of IEEE Infocom, Toronto, Canada, pp. 680-686, Jun. 1994.

(Continued)

Primary Examiner—Frank Duong
(74) Attorney, Agent, or Firm—Winston Hsu

(57) ABSTRACT

A method for objective playout quality measurement of a packet based network transmission includes determining a normalized total delay of a packet for playout and assigning a corresponding delay mean opinion score (DMOS) to the packet, then further determining a normalized packet loss rate of the packet and assigning a corresponding loss mean opinion score (LMOS) to the packet. The method includes averaging the DMOS and the LMOS to determine a mean mean opinion score (MMOS) of the packet and outputting the MMOS of the packet to a display device. The DMOS and LMOS can be assigned referencing continuous modeling equations or can be assigned referencing discrete value lookup tables. The method is performed by a processor.

15 Claims, 4 Drawing Sheets

OTHER PUBLICATIONS

Marco Roccetti, Vietorio Ghini, Giovanni Pau, Paola Salomoni, and Maria Elena Bonfigli, "Design and Experimental Evaluation of an Adaptive Playout Delay Control Mechanism for Packetized Audio for use Over the Internet", Nov. 1998.

H. Schulzrinne, S. Cayner, R. Frederick, V. Jacobson, "RTP=A Transport Protocol for Real-Time Applications", RFC 1889, Jan. 1996.

Jesus Pinto and Kenneth J. Christensen, "An Algorithm for Playout of Packet Voice Based on Adaptive Adjustment of Talkspurt Science Periods."

Phillip Deleon and Cormac J. Sheenan, "An Adaptive Predictor for Media Playout Buffering", Stanford, Mar. 2001.

IUT-T P. 861 (1996)="Objective Quality Measurement of Telephone-Band (300-3 400Hz) Speech Codecs", Feb. 1998.

ETSI EG201 377-1 v1.1.1, "Specification and Measurement of Speech Transmission Quality", Feb. 2001.

IUT-T G.862, "Perceptual Evaluation of Speech Quality (PESQ), an Objective Method for End-to-End Speech Quality Assessment of Narrow Band Telephone Networks and Speech Codecs", Feb. 2001.

\* cited by examiner

METHOD FOR OBJECTIVE PLAYOUT QUALITY MEASUREMENT OF A PACKET BASED NETWORK TRANSMISSION

BACKGROUND OF INVENTION

1. Field of the Invention

The present invention relates to media playout of a network transmission of packets, and more specifically to determining an objective quality of media playout for a playout mechanism.

2. Description of the Prior Art

The popularity of the Internet and wireless communications has lead to the development of technologies that allow real-time digital communication between people. Recently, communication through the Internet and wireless communications networks has been improved for new technologies such as voice over Internet protocol (VoIP) and the other real-time interactive communication systems.

One of the major obstacles in the communication of packets belonging to a network transmission, such as VoIP packets, is variance in network delay known as jitter. Jitter is typically reduced by delaying the playout of packets according to a playout delay. As network delay is not constant, reducing the amount of jitter in a transmission requires reasonable measurements of network delay and accurate estimations of playout delay. However, the playout delay cannot be too long, as the transmission is intended to be real-time and long playout delays defeat this intention. Minimizing playout delay is particularly important in two-way communications, such as through VoIP, wireless phones, videophones, or on-line games, to avoid delay related inconvenience to users when communicating to each other.

FIG. 1 is a schematic diagram that shows packets of data of a voice data 20 being sent across a network 10. For example, the data 20 can be media output from the Internet such as a VoIP transmission, a person's voice being transmitted across a wireless phone network, or similar communications data. The data 20 includes audible ranges 20a, 20c, and 20e where there is discernable audio information and silent ranges 20b and 20d where there is an absence of discernable audio information. A sender 12, being a PC, wireless telephone, or other device, sends packets P1–P15 in order at regular intervals, but because of network delay delaying the transmission of the packets P1–P15 some of the packets P1–P15 arriving at a receiver 14, a similar PC or device, must be further delayed by different amounts to form a cohesive voice data 22. The voice data 22 includes audible ranges 22a, 22c, and 22e and silent ranges 22b and 22d corresponding to the ranges 20a–20e of the sent data 20.

The packet P1 is sent by the sender 12 at a given time. The packet P1 is delayed by the network 10 for any number of reasons, said delay and further delays being indicated in FIG. 1 by a shaded block. The packet P1 is further delayed by the receiver 14 so it can be played contiguously with the packet P2 that is also delayed by the network 10. If the packet P1 is not further delayed by the receiver 14, packets P1 and P2 would not be played contiguously, and an audible break in the data 22 would occur. The audible break in the data 22 would be heard by a listener at the receiver 14, which translates to poor audio quality of the playout data 22.

The packets P2–P5 are all delayed by the network 10 by the same amount of time and do not have to be further delayed by the receiver 14 to be played in sequence with proper timing. However, the packet P7 arrives before the packet P6. The receiver 14 must delay the playout of the packet P7 until the packet P6 is received. This delay is added to the silent range 22b of the data 22 so that the audible range 22c is not affected. The packets P8 and P9 arrive simultaneously as do the packets P10 and P11 because of network delay and packet bursting. Playout of the packets P9 and P11 is accordingly delayed, however, no further delay of the data 22 results. The packets P13 and P14 suffer a similar disorder as the packets P6 and P7. The packets P12 and P15 arrive at the receiver 14 normally.

The above description with reference to FIG. 1 is a simplification. The packets P1–P15 were assumed to arrive at the receiver delayed by an integer multiple of their packet length. In reality, a substantially large number of packets in a given transmission must be delayed, as network delay and jitter are essentially continuous in time and packet length is digital.

FIG. 1 shows that the entire received data 22 is delayed by three blocks by a combination of network delay and additional playout delay added by the receiver 14. If this additional delay were not added by the receiver 14, some packets would be played out of order and others would not be played at all. The prior art teaches a number of ways to estimate the delay required to be added by the receiver 14. However, too much playout delay can result in inconvenience and even misunderstanding between parties in two-way mechanisms. A fundamental and arguably most useful method of estimating playout delay is the mean delay and variance (MDV) method described in R. Ramjee, J. Kurose, D. Towsley, and H. Schulzrinne, "Adaptive Playout Mechanisms for Packetized Audio Applications in Wide-Area Networks", Proceedings of IEEE INFOCOM, Toronto, Canada, pp. 680–686, June 1994, which is incorporated herein by reference. The MDV method is further described in Marco Roccetti, Vittorio Ghini, Giovanni Pau, Paola Salomoni, and Maria Elena Bonfigli, "Design and Experimental Evaluation of an Adaptive Playout Delay Control Mechanism for Packetized Audio for use over the Internet", November 1998, which is also incorporated herein by reference. Briefly, the MDV method estimates playout delay from a variance of a mean network delay in conjunction with a smoothing factor. This simple adaptive approach offers significant improvement over other non-adaptive approaches.

Another method of estimating playout delay is described in the real-time transport protocol (RTP) standard. H. Schulzrinne, S. Casner, R. Frederick, V. Jacobson, "RTP: A Transport Protocol for Real-Time Applications", RFC 1889, January 1996 details the RTP standard and is incorporated herein by reference. The RTP method of estimating delay is essentially the MDV method applied with a fixed smoothing factor. While simpler than the MDV method, the RTP method offers a less accurate estimation of network delay.

Once playout delay has been estimated and calculated, packets of a network transmission can be played out by the receiver 14. The quality of the playout as perceived by a user is directly related to the method, the above described being examples, of determining the playout delay. In order to determine which method yields the best playout quality it is of interest to develop a quality measurement system.

Several prior art methods of determining playout quality are taught in ITU-T P.861 (1996), "Objective quality measurement of telephone-band (300–3400 Hz) speech codecs", 02.1998; ETSI EG 201 377-1 V1.1.1, "Specification and measurement of speech transmission quality", 02.2001; and ITU-T G.862, "Perceptual evaluation of speech quality (PESQ), an objective method for end-to-end speech quality assessment of narrow band telephone networks and speech codecs", 02.2001 all of which are included herein by reference. These methods, relating to speech quality, are not well suited for two-way communication, and cannot readily measure the effects of echo and comfortable interruption. Furthermore, the prior art methods of measuring playout quality are not well suited to comparing different playout mechanisms.

In addition, the prior art has numerous patents relating to objective playout quality measurement. Regardless of how applied, whether to measuring signal, speech, or video quality, the prior art patents are only suitable for static data or one-way communication.

SUMMARY OF INVENTION

It is therefore a primary objective of the claimed invention to provide a method for determining an objective playout quality to solve the problems of the prior art.

Briefly summarized, the claimed invention includes using a processor to determine a normalized total delay of a packet for playout of a network transmission and assign a corresponding delay mean opinion score (DMOS) to the packet. The claimed invention method further determines a normalized packet loss rate of the packet and assigns a corresponding loss mean opinion score (LMOS) to the packet. Finally, the claimed invention method averages the DMOS and the LMOS to determine a mean mean opinion score (MMOS) of the packet before outputting the MMOS of the packet to a display device.

According to the claimed invention, the DMOS and LMOS can be assigned referencing continuous modeling equations or can be assigned referencing discrete value lookup tables.

According to the claimed invention, the method can further include ranking a plurality of packet playout mechanisms based on averaged MMOS values for each playout mechanism.

It is an advantage of the claimed invention that the MMOS of the packet is an objective measure of packet playout quality.

It is a further advantage of the claimed invention that the MMOS can be used to compare, assess, and rank different playout mechanisms.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
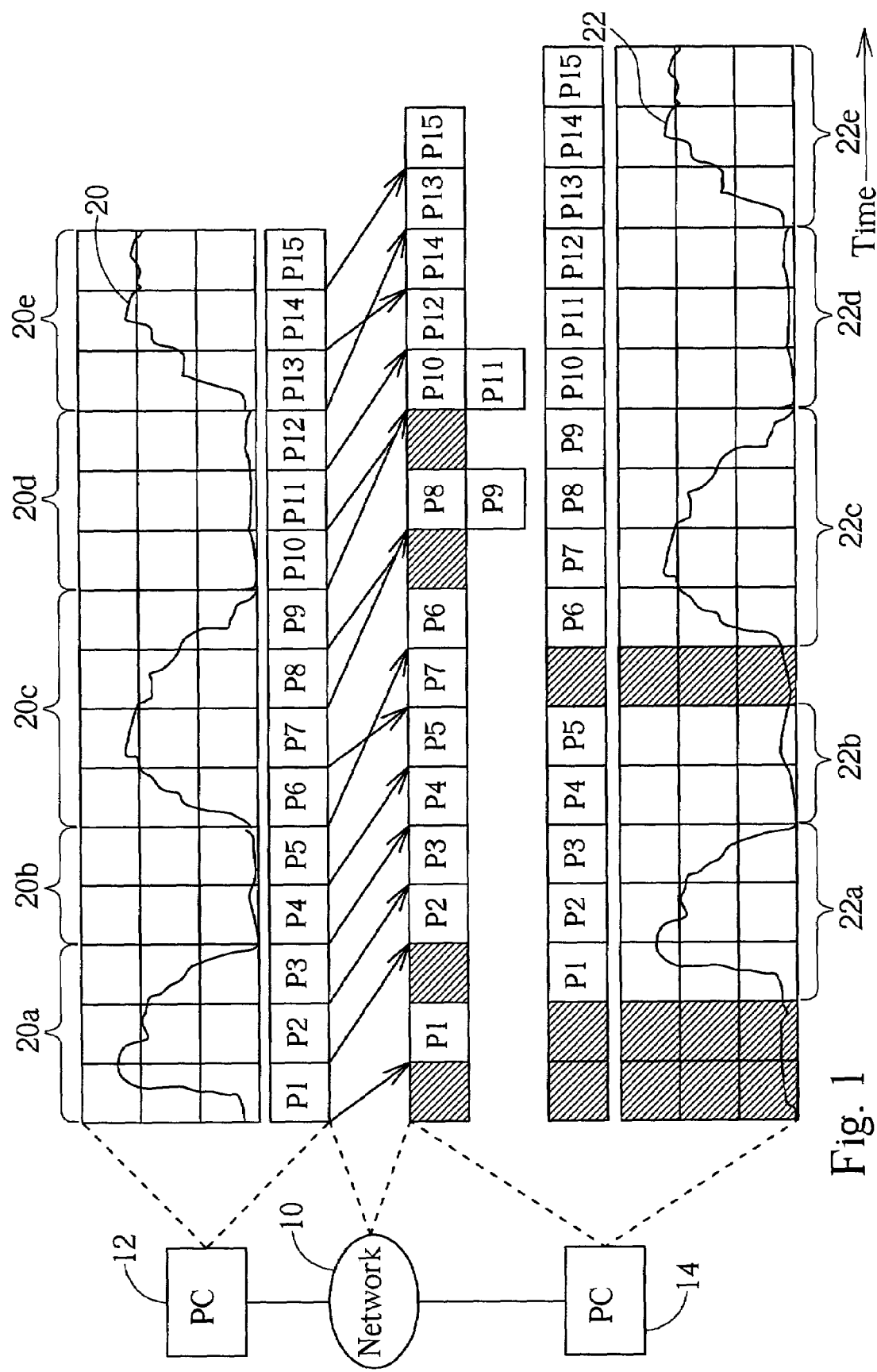
FIG. 1 is a schematic diagram showing packets of voice data being sent across a network.
Figure 2:
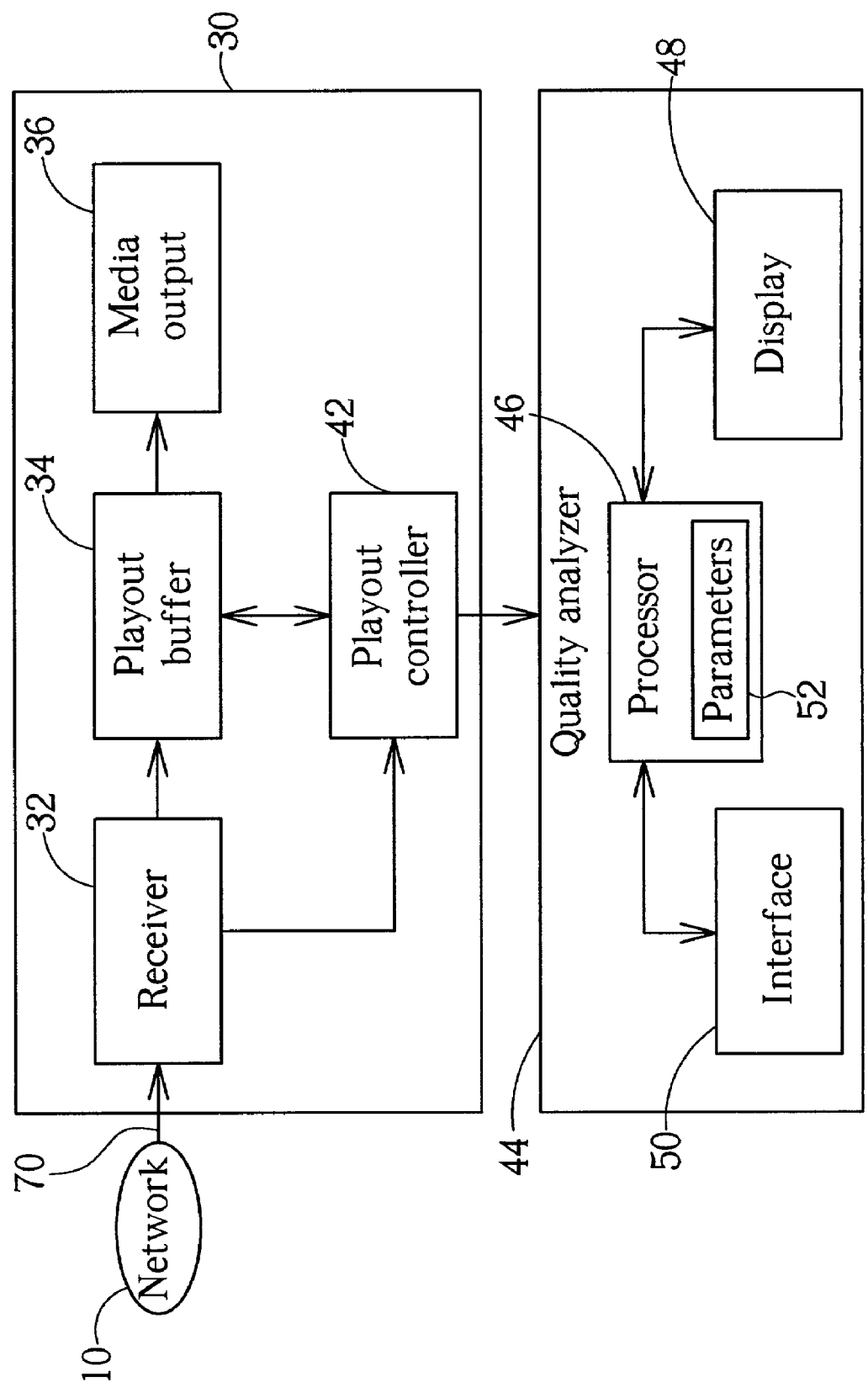
FIG. 2 is a block diagram of a communications device and a quality analyzer according to the present invention.

Please refer to FIG. 2. FIG. 2 illustrates receiving system architecture for a communications device 30 similar to the receiver 14 of FIG. 1. The communications device 30 is a PC, however, the present invention can be adapted to wireless phone or other similar communications device. The communications device 30 also has transmission architecture, however, this is omitted for clarity. The communications device 30 includes a receiver 32 that is connected to the network 10 for receiving packets of information from other terminals of the network 10. The receiver forwards packets to a playout buffer 34. The playout buffer 34 delays packets according to delays determined by a playout controller 42. The playout controller 42 calculates playout delays from network statistics according to a set playout mechanism. The playout buffer 34 then delays the packets by the playout delays before forwarding them to the media output device 36 for playout. The media output device 36 is typically a speaker, monitor, or other PC output device. In this way, the communications device 30 can smooth the playout of packets according to the playout mechanism to lessen the effects of network jitter.

The playout mechanism of the playout controller 42 can be a method such as mean delay and variance (MDV) or real-time transport protocol (RTP) as previously described. In the preferred embodiment, the playout mechanism is software that is executed by the communications device 30, however, it could also be hardware or software emulated hardware. For example, the playout controller 42 can calculate playout delays for packets of a received network transmission, signified by an arrow 70 in FIG. 2, according to the MDV method as follows:

$$D_i=|(R_i-R_{i-1})-(S_i-S_{i-1})|$$

$$MD_i=F \times MD_{i-1}+(1-F) \times D_i$$

$$V_i=|MD_i-D_i|$$

$$MV_i=F \times MV_{i-1}+(1-F) \times V_i$$

$$PD_i=MV_i \times SF \qquad \text{(Eqns. 1)}$$

where,
D is network delay;
R is a receiver timestamp;
S is a sender timestamp;
i is an index that denotes a current packet;
i−1 is an index that denotes a previous packet;
MD is mean network delay;
F is a smoothing factor;
V is network delay variance;
MV is mean network delay variance;
PD is a playout delay;
SF is a scaling factor;

In the example, the playout controller 42 first calculates the network delay of the current packet by comparing timestamps of the current packet to timestamps of the previous packet. The playout controller 42 then calculates a mean network delay variance based on a mean network delay and a smoothing factor. Finally, the playout controller 42 applies a scaling factor to determine the playout delay for the current packet. The timestamps are made available to the playout controller 42 by the receiver 32. The smoothing and scaling factors are set internally to the playout controller 42 and can be adjusted. The playout delay is forwarded by the playout controller 42 to the playout buffer 34. The MDV method as described is performed continuously and in real-time for each packet of the received network transmission. Moreover, the network transmission can be for a voice over Internet protocol (VoIP), videophone, on-line game, or other real-time interactive communication.

As mentioned before, playout quality is directly linked to the playout mechanism. For instance, the formulation of the MDV method as described by Eqns. 1 is key to how a person using the communications device 30 will appreciate output of the media output device 36. If the network transmission is voice, the listener may hear breaks or pauses if the network delay has high variance (high jitter). If the output is video or game output, the viewer may experience frame skipping or poor performance. These effects detract from the overall playout quality experienced by the listener or viewer.

Referring to FIG. 2, a quality analyzer 44 is connected to the playout controller 42 to determine an objective playout quality measurement. The quality analyzer 44 includes a processor 46 for performing quality analysis according to parameters 52, a display device 48 for outputting measured quality values to a user, and an interface 50 through which the user can adjust the parameters 52. In the preferred embodiment, the processor 46 is a computer processor and the display device 48 is a computer monitor. The quality analyzer 44 is connected to the playout controller 42 for convenience, as the playout controller 42 contains all information required by for preferred embodiment method. Alternatively, the playout quality measurement could be performed by the playout controller 42 itself. The processor 46 of the quality analyzer 44 determines a delay mean opinion score (DMOS) for the current packet of a received network transmission for playout as follows:

$$NTD_i = \frac{TD_1^{DF}}{MAX\_TD}$$ (Eqns. 2)

$$DMOS_1 = MAX\_MOS \times (1 - NTD_1)^{DM}$$

where,
NTD is a normalized total delay;
TD is a total delay;
DF is a delay factor;
MAX_TD is a maximum total delay;
DMOS is a delay mean opinion score;
MAX_MOS is a maximum mean opinion score;
DM is a DMOS factor;

The normalized total delay for the current packet is calculated referencing the total delay for the current packet and the maximum total delay for a group of packets of the transmission. The total delay includes a codec delay that is the time required by the codec of the communications device 30 to compress and uncompress packet data, a network delay of transmission, and a packet playout delay. The DMOS for the current packet is then determined using the normalized total delay and a maximum mean opinion score (MOS). The maximum MOS is codec dependant and is can be empirically determined by measuring objective playout qualities for a plurality of playout mechanisms under ideal conditions. The delay factor and DMOS factor exponents are also empirically determined and can be further adjusted by the user.

In the preferred embodiment, the processor 46 performs the calculations of Eqns. 2 to determine the DMOS for the current packet, and further determines a loss mean opinion score (LMOS) for the current packet as follows:

$$NPLR_1 = \frac{PLR_1^{LF}}{MAX\_PLR}$$ (Eqns. 3)

$$LMOS_1 = MAX\_MOS \times (1 - NPLR_1)^{LM}$$

where,
NPLR is a normalized packet loss rate;
PLR is a packet loss rate;
LF is a loss factor;
MAX_PLR is a maximum packet loss rate;
LMOS is a loss mean opinion score;
LM is an LMOS factor;

The normalized packet loss rate for the current packet is calculated referencing the packet loss rate for the current packet and the maximum packet loss rate for a group of packets of the transmission. The packet loss rate is substantially a rate that transmission times of packets are longer that a predetermined time, as is well known in the art. The LMOS of the current packet is then determined referencing the normalized packet loss rate and the maximum MOS. The loss factor and LMOS factor exponents are empirically determined and can further be adjusted by the user.

Once, the DMOS and LMOS have been determined for the current packet, they are averaged according to Eqns. 4 to obtain a mean mean opinion score (MMOS):

$$MMOS_i = \frac{LMOS_1 + DMOS_1}{2}$$ (Eqn. 4)

where,
MMOS is a mean mean opinion score;

As an alternative to Eqns. 2, Eqns. 3, and Eqn. 4, the DMOS, LMOS, and MMOS values can be tabulated by codec. This allows for more convenient, but less accurate, determination of the playout quality as well as qualitative classification (excellent-worst). An example of tabulated data for the G.711 codec is shown in Table 1 below:

TABLE 1

| G.711 MOS | | | | |
|---|---|---|---|---|
| Quality | Loss | Delay | LMOS | DMOS |
| Excellent | 0.05 | 60.00 | 4.50 | 4.50 |
| Good | 0.10 | 120.00 | 3.50 | 4.00 |
| Medium | 0.15 | 240.00 | 3.00 | 3.50 |
| Poor | 0.25 | 480.00 | 2.00 | 2.50 |
| Worst | 0.35 | 720.00 | 1.00 | 2.00 |

The tabulated data shown in Table 1 inherently considers the tunable factors of the previously described equations (Eqns. 2 and Eqns. 3). This allows for convenient discrete modeling that is readily adaptable to an integrated circuit or digital application. The packet loss rate and total delay are used to lookup values for LMOS and DMOS.

Regardless of whether continuous or discrete modeling is used, the MMOS is output by the display 48 of the quality analyzer 44 as an objective playout quality measurement. Alternatively, if conditions permit, the DMOS and LMOS can be independently used as objective playout quality measurements. The parameters 52 that the user can modify utilizing the interface 50 include the delay factor DF, DMOS factor DM, loss factor LF, LMOS factor LM, and maximum mean opinion score MAX_MOS. The MMOS output can then be used by the human user to configure playout of network transmissions or determine a most suitable playout mechanism.

Figure 3:
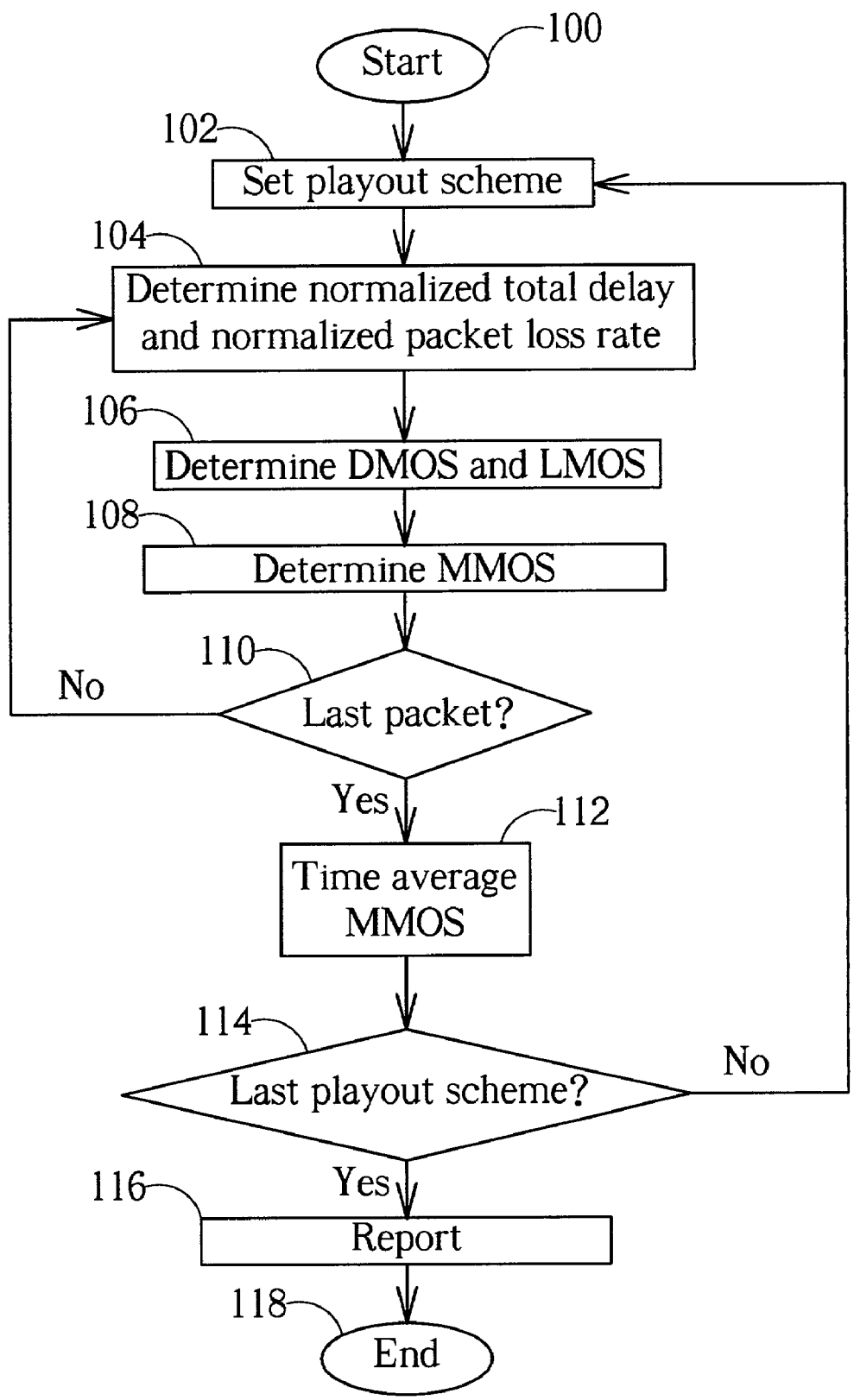
FIG. 3 is a flowchart showing a method according to the present invention.

Referring to the flowchart of FIG. 3, the present invention can determine a most suitable playout mechanism from a plurality of playout mechanisms. For a given playout mechanism, the method is applied to a group of packets of a network transmission. For a balanced comparison of playout mechanisms, network conditions and the length of the network transmission should be kept constant between playout mechanisms. The steps of the flowchart of FIG. 3 are explained as follows:

Step 100: Start;

Step 102:

Activate a playout mechanism or scheme for quality measurement. Begin network transmission and playout at the receiving communications device 30;

Step 104:

Determine a network delay and packet loss rate for a current packet of the network transmission according to the current playout mechanism. Then normalize the network delay and packet loss rate of the current packet (Eqns. 2);

Step 106:

Determine, by calculation (Eqns. 2 and 3) or table lookup (e.g. Table 1), DMOS and LMOS values for the current packet;

Step 108:

Using the DMOS and LMOS values and Eqn. 4 calculate the MMOS value for the current packet, or reference a lookup table for MMOS (e.g. Table 1);

Step 110: Is this the last packet of the network transmission? If it is, then go to step 112. If not, then index a next packet as the current packet and return to step 104;

Step 112:

Average the MMOS values for the packets of the network transmission for the playout mechanism under consideration;

Step 114:

Is this the last playout mechanism to be compared? If it is, then go to step 116. If there is another playout mechanism to be measured return to step 102;

Step 116:

Averaged MMOS output for the playout mechanisms are reported to a user through the display 48;

Step 118: End.

Steps 104 to 114 are performed by the processor 46 of the quality analyzer 44. In practical application, the above-described procedure with reference to FIG. 3 can be performed in an actual physical network environment or on a simulated network. The user can then utilize the output MMOS data for each playout mechanism to evaluate and rank the plurality of playout mechanisms.

Figure 4:
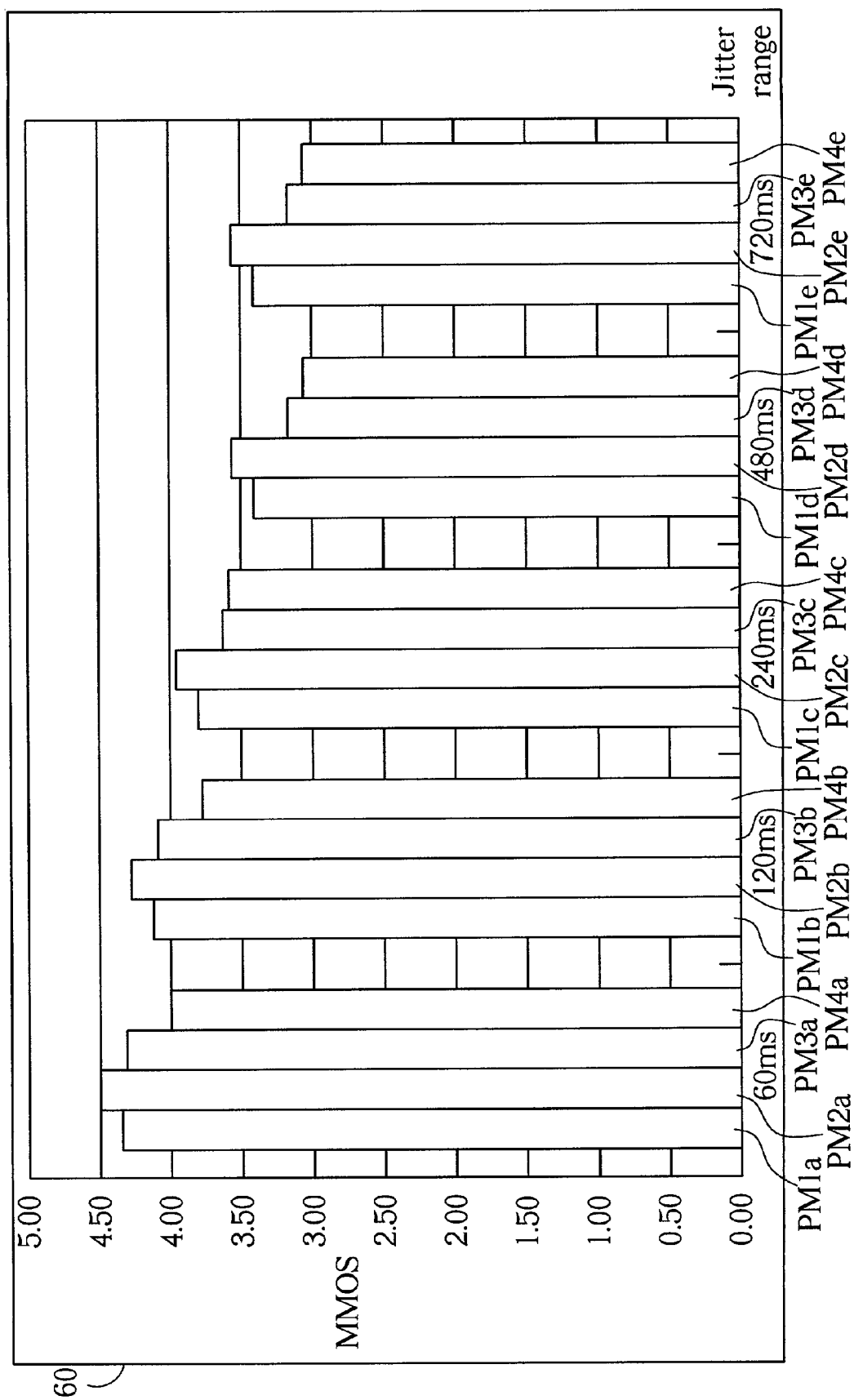
FIG. 4 is a sample of graphical output of the quality analyzer of FIG. 2 according to the method of FIG. 3.

Please refer to FIG. 4 showing a sample of graphical output 60 that is displayed on the display 48 of the quality analyzer 44. The plurality of playout mechanisms are measured for quality according to the method of the present invention for a range of network jitters (network delay variances) of 60 ms to 720 ms. This yields graphical bars PM1a–PM4a through PM1e–PM4e, where PM1–PM4 identify considered playout mechanisms and a–e identify jitter ranges. The height of the bars indicates the MMOS quality on a scale of 0.00 to 5.00. Naturally, the numerical values of the jitter ranges and the MMOS values shown in FIG. 4 are simply examples. Thus, the MMOS for each playout mechanism over a range of jitters can be compared by the user to determine the most suitable playout mechanism for a given application.

In contrast to the prior art, the present invention method provides an objective measure of playout quality for playout of a packet based network transmission. The playout quality, or MMOS, is determined by a processor using normalized total packet delays, normalized packet loss rates, codec information, and user adjustable parameters. The MMOS values are finally displayed as graphical output on a display device and made available to a human user.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for using a processor to determine an objective playout quality of a network transmission within a network, said network transmission comprising information in packets for playout according to a playout mechanism, the method comprising:

determining a total delay of a packet, said total delay depending on a time of transmission of the packet between two nodes of the network;

normalizing the total delay of the packet with respect to a maximum total delay of a group of packets;

assigning a delay mean opinion score (DMOS) to the packet based on the normalized total delay of the packet;

determining a packet loss rate of the packet, said packet loss rate depending on transmission times of packets transmitted between two nodes of the network being longer than a predetermined time;

normalizing the packet loss rate with respect to a maximum packet loss rate of a group of packets;

assigning a loss mean opinion score (LMOS) to the packet based on the normalized packet loss rate of the packet;

combining the DMOS and the LMOS to determine a mean mean opinion score (MMOS) of the packet; and outputting the MMOS of the packet to a display device.

2. The method of claim 1 wherein the normalized total delay, the normalized packet loss rate, the DMOS, and the LMOS are determined and assigned referencing continuous modeling equations.

3. The method of claim 1 wherein the normalized total delay, the normalized packet loss rate, the DMOS, and the LMOS are determined and assigned referencing discrete value lookup tables.

4. The method of claim 1 wherein the MMOS is an arithmetic mean of the DMOS and the LMOS.

5. The method of claim 1 further comprising:

averaging MMOS values for a plurality of packets over a time period to determine a time averaged MMOS value for the playout mechanism for the network transmission.

6. The method of claim 5 applied to ranking a plurality of playout mechanisms, the method further comprising:

ranking the plurality of playout mechanisms based on the time averaged MMOS values for each playout mechanism.

7. The method of claim 1 further comprising:

providing a user interface through which a human user can adjust mathematical parameters of the normalization of the total delay of the packet, the assignment of the DMOS to the packet, the normalization of the packet loss rate of the packet, and the assignment of the LMOS to the packet.

8. The method of claim 1 wherein the network transmission is for a voice over Internet protocol (VoIP), videophone, on-line game, or other real-time interactive communication.

9. The method of claim 1 wherein the network is a computer network or a radio transmission network for wireless phones.

10. A method for using a processor to determine an objective playout quality of a network transmission within a network, said network transmission comprising information in packets for playout according to a playout mechanism, the method comprising:
- determining a total delay of a packet, said total delay comprising a time of transmission of the packet between two nodes of the network;
- calculating a normalized total delay as a ratio of the total delay for the packet to a maximum total delay, said ratio raised to a power of a delay factor;
- calculating a delay mean opinion score (DMOS) of the packet as a result of one minus the normalized total delay, said result being raised to a power of a DMOS factor, and said further being multiplied by a maximum mean opinion score (MOS); and
- outputting the calculated DMOS of the packet to a display device.

11. The method of claim 10 wherein the delay factor and the DMOS factor are experimentally determined constants.

12. The method of claim 10 wherein the maximum MOS is a maximum value that is set according to the playout mechanism.

13. A method for using a processor to determine an objective playout quality of a network transmission within a network, said network transmission comprising information in packets for playout according to a playout mechanism, the method comprising:
- determining a packet loss rate of a packet, said packet loss rate comprising a rate that a transmission time of packets transmitted between the two nodes is longer that a predetermined time;
- calculating a normalized packet loss rate as a ratio of the packet loss rate for the packet to a maximum packet loss rate, said ratio raised to a power of a loss factor;
- calculating a loss mean opinion score (LMOS) of the packet as a result of one minus the normalized packet loss rate, said result being raised to a power of an LMOS factor, and said result further being multiplied by a maximum mean opinion score (MOS); and
- outputting the calculated LMOS of the packet to a display device.

14. The method of claim 13 wherein the loss factor and the LMOS factor are experimentally determined constants.

15. The method of claim 13 wherein the maximum MOS is a maximum value that is set according to the playout mechanism.

* * * * *